United States Patent
Pithawala et al.

(10) Patent No.: US 10,616,379 B2
(45) Date of Patent: Apr. 7, 2020

(54) SEAMLESS MOBILITY AND SESSION CONTINUITY WITH TCP MOBILITY OPTION

(71) Applicant: Futurewei Technologies, Inc., Plano, TX (US)

(72) Inventors: Burjiz Pithawala, Cupertino, CA (US); Uma S. Chunduri, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/001,767

(22) Filed: Jun. 6, 2018

(65) Prior Publication Data

US 2018/0375967 A1    Dec. 27, 2018

Related U.S. Application Data

(60) Provisional application No. 62/524,278, filed on Jun. 23, 2017.

(51) Int. Cl.
| | |
|---|---|
| *H04W 56/00* | (2009.01) |
| *H04W 80/04* | (2009.01) |
| *H04L 29/06* | (2006.01) |
| *H04W 80/06* | (2009.01) |

(52) U.S. Cl.
CPC ......... *H04L 69/162* (2013.01); *H04W 56/001* (2013.01); *H04W 80/04* (2013.01); *H04W 80/06* (2013.01)

(58) Field of Classification Search
CPC .... H04L 69/162; H04W 8/26; H04W 36/023; H04W 56/001; H04W 80/04; H04W 80/06; H04W 36/0011; H04W 36/14

USPC ............... 370/252, 312, 331, 356, 328, 338
See application file for complete search history.

(56) References Cited

U.S. PATENT DOCUMENTS

2008/0095138 A1 *  4/2008  Wu .................. H04W 8/26
                                                                370/342
2012/0131663 A1 *  5/2012  Anchan ............ H04L 29/12471
                                                                726/13

FOREIGN PATENT DOCUMENTS

| CN | 101345696 A | 1/2009 |
|---|---|---|
| CN | 101827111 A | 9/2010 |
| WO | 2015132630 A1 | 9/2015 |

OTHER PUBLICATIONS

Alex C. Snoeren, An End-to-End Approach to Host Mobility, ACM/IEEE, MobiCom '00 (Year: 2000).*

(Continued)

*Primary Examiner* — Harun Chowdhury
(74) *Attorney, Agent, or Firm* — Conley Rose, P.C.

(57) ABSTRACT

A method for providing mobility for Transmission Control Protocol (TCP) transport with session continuity. In one embodiment, the method establishes a communication session between a first communication device and a second communication device using a TCP seamless mobility option (TCP-SMO) connection identifier for identifying the communication session between the first communication device and the second communication device. The method exchanges data between the communication device and the second communication device during the communication session. The method maintains the communication session between the communication device and the second communication device in response to a mobility event using the TCP-SMO connection identifier.

20 Claims, 8 Drawing Sheets

(56) References Cited

OTHER PUBLICATIONS

D. Harkins, RFC 2409, The Internet Key Exchange (IKE) (Year: 1998).*
Machine Translation and Abstract of Chinese Publication No. CN101345696, Jan. 14, 2009, 13 pages.
Machine Translation and Abstract of Chinese Publication No. CN101827111, Sep. 8, 2010, 17 pages.
Foreign Communication From A Counterpart Application, PCT Application No. PCT/CN2018/090568, English Translation of International Search Report dated Sep. 4, 2018, 5 pages.
Foreign Communication From A Counterpart Application, PCT Application No. PCT/CN2018/090568, English Translation of Written Opinion dated Sep. 4, 2018, 4 pages.
Farinacci, et al., "LISP Mobile Node," draft-ietf-lisp-mn-0, Apr. 28, 2017, 23 pages.
Hamilton, et al., "QUIC: A UDP-Based Secure and Reliable Transport for HTTP/2," draft-tsvwg-quic-protocol-02, Jan. 13, 2016, 37 pages.
Farinacci, et al., "The Locator/ID Separation Protocol (LISP)," RFC 6830, Jan. 2013, 76 pages.
Moskowitz, Ed., et al., "Host Identity Protocol Version 2 (HIPv2)," RFC 7401, Apr. 2015, 129 pages.
"Transmission Control Protocol, Darpa Internet Program, Protocol Specification," RFC 793, Sep. 1981, 90 pages.
Touch, J., et al., "The TCP Authentication Option," RFC 5925, Jun. 2010, 48 pages.
Cheng, Y., "TCP Fast Open," RFC 7413, Dec. 2014, 26 pages.
Khalili, R., "Congestion Control of Multipath TCP: Problems and Solutions," https://www.ietf.org/proceedings/87/slides/slides-87-iccrg-7.pdf, 26 pages.
Khalili, R., "Performance issues with MPTCP," https://www.ietf.org/proceedings/84/slides/slides-84-mptcp-4.pdf, 22 pages.
Pillay-Esnault, Ed., et al., "Problem Statement for Identity Enabled Networks," draft-padma-ideas-problem-statement-01, Mar. 12, 2017, 15 pages.

* cited by examiner

SEAMLESS MOBILITY AND SESSION CONTINUITY WITH TCP MOBILITY OPTION

CROSS-REFERENCE TO RELATED APPLICATIONS

This application claims priority to U.S. provisional patent application No. 62/524,278 filed on Jun. 23, 2017 titled "Seamless Mobility and Session Continuity with TCP Mobility Option," which is incorporated by reference.

TECHNICAL FIELD

Embodiments of the present disclosure relate to the field of wireless communications, and in particular, to a method and an apparatus for providing seamless mobility and session continuity using a Transmission Control Protocol (TCP) mobility option.

BACKGROUND

The TCP is one of the main protocols of the Internet Protocol (IP) suite. TCP defines how to establish and maintain a network communication session. TCP provides reliable, ordered, and error-checked delivery of a stream of octets between applications running on hosts communicating by an IP network. Major Internet applications such as the World Wide Web, email, remote administration, and file transfer rely on TCP.

SUMMARY

According to a first aspect of the present disclosure, there is provided a method performed by a first communication device for providing mobility for Transmission Control Protocol (TCP) transport with session continuity between a first communication device and a second communication device. The method includes establishing a communication session between the first communication device and the second communication device using a TCP seamless mobility option (TCP-SMO) connection identifier for identifying the communication session between the first communication device and the second communication device. The method exchanges data between the first communication device and the second communication device during the communication session. The method maintains the communication session between the first communication device and the second communication device in response to a mobility event using the TCP-SMO connection identifier.

According to a second aspect of the present disclosure, there is provided a communication device that includes a network communication interface configured to enable communication over a network; a memory storage unit comprising instructions; and one or more processors in communication with the network communication interface and the memory storage unit, wherein the one or more processors execute the instructions to: establish a communication session between the communication device and a second communication device using a TCP seamless mobility option (TCP-SMO) connection identifier for identifying the communication session between the communication device and the second communication device; exchange data between the communication device and the second communication device during the communication session; and maintain the communication session between the communication device and the second communication device in response to a mobility event using the TCP-SMO connection identifier.

According to a third aspect of the present disclosure, there is provided a data structure for providing mobility for Transmission Control Protocol (TCP) transport with session continuity between a first communication device and a second communication device. The data structure may include one or more of the following fields: a source connection identifier field for specifying a source connection identifier; a destination connection identifier field for specifying a destination connection identifier; a mobility event field for specifying a mobility event; a security options field for specifying security options; and an optional data field for specifying a checksum of a generated hash using a content identifier.

In the any of the preceding aspects, the TCP-SMO connection identifier may include a first TCP-SMO connection identifier of the first communication device and/or a second TCP-SMO connection identifier of the second communication device.

In the any of the preceding aspects, establishing the communication session between the first communication device and the second communication device may include transmitting, by the first communication device, a TCP-Synchronize (TCP-SYN) message with the TCP-SMO connection identifier in a TCP header of the TCP-SYN message to the second communication device; receiving, by the first communication device, a Synchronize-Acknowledgement (SYN-ACK) message with the TCP-SMO connection identifier in the TCP header of the SYN-ACK message indicating that the second communication device supports TCP-SMO; and transmitting, by the first communication device, a Synchronize-Acknowledgement-Acknowledgement (SYN-ACK-ACK) message with the TCP-SMO connection identifier in the TCP header of the SYN-ACK-ACK message to the second communication device acknowledging receipt of the SYN-ACK message to establish the communication session between the first communication device and the second communication device.

In the any of the preceding aspects, maintaining the communication session between the first communication device and the second communication device in response to the mobility event may include receiving, by the first communication device, a new IP address of the second communication device from the second communication device during the communication session in response to the mobility event.

In the any of the preceding aspects, maintaining the communication session between the first communication device and the second communication device in response to the mobility event may include transmitting, by the first communication device, a new IP address of the first communication device to the second communication device during the communication session in response to the mobility event.

In the any of the preceding aspects, a new IP address may be transmitted in an empty data packet or in a TCP keepalive probe packet.

In the any of the preceding aspects, the TCP-SMO connection identifier may be a unique randomly generated identifier that is generated by a TCP stack of the first communication device or is provided to a TCP layer of the first communication device by one of an application or a second protocol during opening of a TCP socket.

In the any of the preceding aspects, the TCP-SMO connection identifier may be included in a TCP-SMO data structure. The TCP-SMO data structure may include a security field for specifying security options. The security options may include transport security protocols TCP-Authentication Option (TCP-AO), TCP-Message Digest5 (TCP-MD5), and a Diffie-Hellman (DH) key exchange between the first communication device and the second communication device. The security field may be a two bit field configurable to specify any DH group as a security option to protect an IP address change notification in response to the mobility event.

The above aspects and other aspects as well as the advantages thereof are described below in the Detailed Description.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
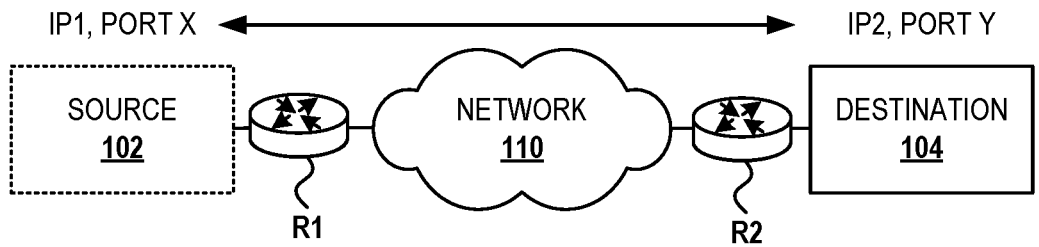
FIG. 1 is a schematic diagram illustrating current TCP connection between a source device and a destination device in accordance with an embodiment of the present disclosure.

The illustrated figures are only exemplary and are not intended to assert or imply any limitation with regard to the environment, architecture, design, or process in which different embodiments may be implemented. Any optional component or steps are indicated using dash lines in the illustrated figures.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to". Unless otherwise indicated, as used throughout this document, "or" does not require mutual exclusivity, and the singular forms "a", "an", and "the" are intended to include the plural forms as well, unless the context clearly indicates otherwise.

A module or unit as referenced herein may comprise one or more hardware or electrical components such as electrical circuitry, processors, and memory that may be specially configured to perform a particular function. The memory may be volatile memory or non-volatile memory that stores data such as, but not limited to, computer executable instructions, machine code, and other various forms of data. The module or unit may be configured to use the data to execute one or more instructions to perform one or more tasks. In certain instances, a unit may also refer to a particular set of functions, software instructions, or circuitry that is configured to perform a specific task.

A network as referenced herein means a system of electronic devices that are joined together via communication links to enable the exchanging of information and/or the sharing of resources. Non-limiting examples of networks include local-area networks (LANs), wide-area networks (WANs), metropolitan-area networks (MANs), passive optical networks (PONs), and radio access networks (RANs). The networks may include one or more private networks and/or public networks such as the Internet. In various embodiments, the networks may employ any type of communication standards and/or protocol.

TCP is a connection-oriented reliable transport protocol layered over IP. TCP is the primary transport protocol used to provide reliable, full-duplex connections. The most common use of TCP is to exchange TCP data encapsulated in an IP datagram. An IP datagram includes an IP header and a TCP segment. The TCP segment includes a TCP header and optional TCP data. TCP segments are exchanged to establish connections, transfer data, send acknowledgements, advertise window sizes, and close connections.

Each TCP connection maintains a state of the connection, usually in a data structure called the TCB. The TCB contains information about the connection state, timers, flags, local and remote host numbers and ports, and feedback parameters about the connection's transmission properties. The TCB is maintained on a per-connection basis. As currently implemented, when a TCP connection is opened with a peer, the connection (e.g., TCP Session or Socket) is identified by source port, destination port, source IP address, and destination IP address by both initiator and responder of the connection. The source port and the destination port are provided in the TCP header. The source IP address and destination IP are provided in the IP header.

This connection is identified by the socket parameters and stored in the TCB. Any change to the connection identifier (e.g., source IP address and/or destination IP address) at either end of the connection such as when an endpoint moves/switches its network connection causes either a TCP Reset (RST) to occur or the session to eventually time out.

Accordingly, the disclosed embodiments include a system, method, and new data structure for providing seamless mobility and session continuity with TCP Mobility Option, also referred to herein as a "TCP-Seamless Mobility Option (TCP-SMO)." In accordance with the disclosed embodiments, the TCP-SMO includes connection identifiers that are used for the TCB or connection identification in the TCP. By using the connection identifiers in the new TCP-SMO instead of the regular TCB connection identifiers as currently defined by request for comment (RFC) 793, which uses the source and destination IP address in the TCP, session continuity is achieved for communication sessions that are established between endpoints that support the new TCP-SMO even if any endpoint of the connection changes its IP address. The disclosed embodiments reduces delay in communications by eliminating the time and process of terminating a communication session and re-establishing a new communication session due to a change in an endpoint's IP address.

FIG. 1 illustrates a current TCP connection between a client or source 102 and a destination 104. The source 102 and the destination 104 may be any type of electronic communication devices such as a personal computer, mobile computing/communication device, and/or a server. The source 102 establishes a connection to a network 110 through a router/switch R1, and the destination 104 is connected to the network 110 through a router/switch R2. To identify the separate data streams that a TCP may handle, the TCP provides a port identifier. Because port identifiers are selected independently by each TCP, they may not be unique. Thus, to provide for unique addresses within each TCP, an IP address (IP1) of the source 102 and its port identifier (Port X), and an IP address (IP2) of the destination 104 and its port identifier (Port Y) is used to create a socket that is unique throughout the network 110 for identifying the data stream between the source 102 and the destination 104. The TCP stores the socket information (IP1, IP2, Port X, Port Y) for the communication session between the source 102 and a destination 104 in the TCB.

Figure 2:
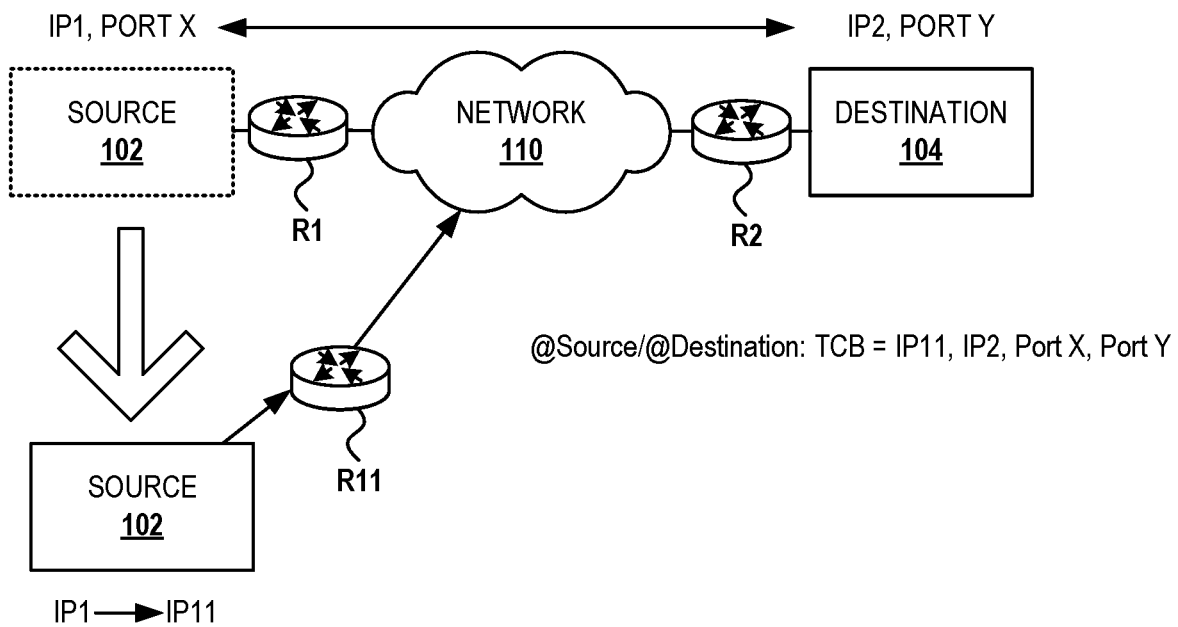
FIG. 2 is a schematic diagram illustrating a change in IP address during the TCP connection of FIG. 1 in accordance with an embodiment of the present disclosure.

FIG. 2 illustrates the effects of the source 102/client device moving and switching to a different router R11 for connecting with the network 110 after having established the TCP connection shown in FIG. 1. As an example, a user on a mobile phone or a Wi-Fi network moves to a point where they cross the boundary of router R1 and enter the boundary of router R11. At the boundary of mobility, the source 102 switches its connection to the network 110 from using router R1 to using router R11. Due to the new connection, the source 102 acquires a new IP address (IP11). If the source 102 continues to send data with this new IP address (IP11) on the same connection that was established in FIG. 1, the destination 104 eventually either times out or sends a RST for the received message with changed IP address, and closes/resets the connection. Thus, under current TCP implementation (as defined in RFC 793), all sessions based on IP addresses need to be disconnected and started when a mobility event occurs. This process introduces a delay in communication as a new communication session has to be reestablished between the source 102 and a destination 104.

Figure 3:
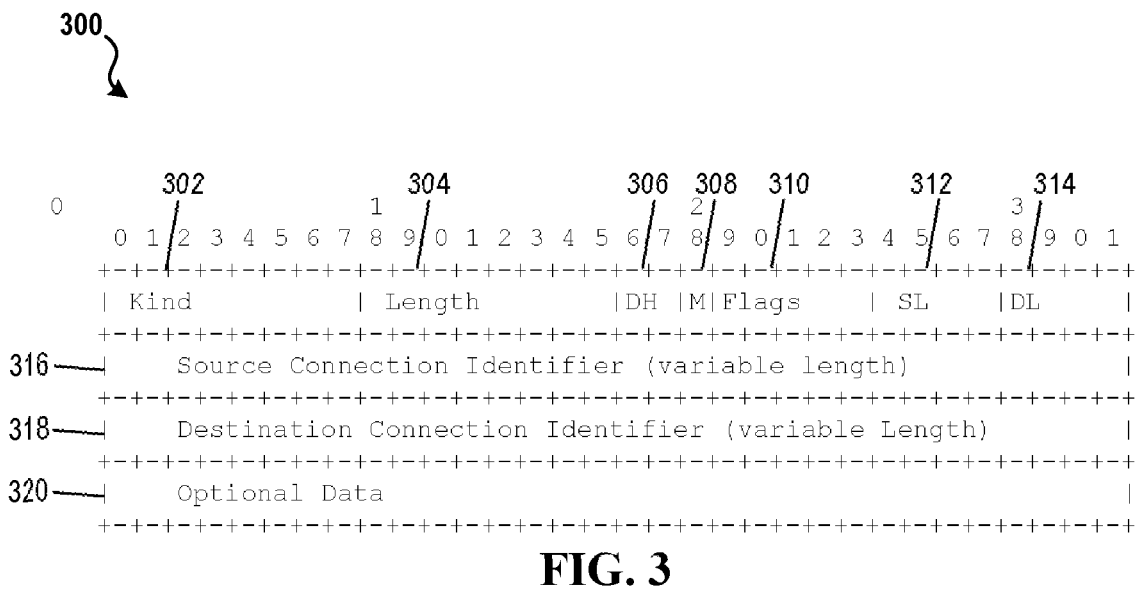
FIG. 3 is a schematic diagram illustrating a TCP-SMO data structure in accordance with an embodiment of the present disclosure.

Accordingly, the disclosed embodiments seek to provide seamless mobility with an uninterrupted TCP connection using a new TCP-SMO. In one embodiment, the new TCP-SMO introduces connection identifiers and configures TCP to use these identifiers for TCB or connection identification. As an example, FIG. 3 is a schematic diagram illustrating a TCP-SMO data structure 300 that may be used as part of the TCP header to implement the disclosed embodiments. The disclosed embodiment of FIG. 3 and its fields are just one example of a TCP-SMO in accordance with the disclosed embodiments and may vary in alternative embodiments such as those ultimately determined by the Internet Engineering Task Force (IETF).

In the depicted embodiment, the a TCP-SMO data structure 300 includes a kind field 302, a length field 304, a security options (DH) field 306, an mobility (M) field 308, a flags field 310, a source length (SL) field 312, a destination length (DL) field 314, a source connection identifier (CID) field 316, a destination CID field 318, and an optional data field 320. In one embodiment, the kind field 302 is an optional header field that may be used to provide various information. As an example, the TCP Internet Assigned Numbers Authority (IANA) may designate the use of the kind field 302. The length field 304 may be used to specify the total length of the TCP-SMO data structure 300 in bytes (including kind field 302 and length field 304). In one embodiment, the length field 304 has a minimum value of 12 bytes and a maximum value of 40 bytes. In one embodiment, when the length field 304 is less than 12 bytes, the TCP discards the segment.

In one embodiment, the DH field 306 is 2 bits and is used for specifying security options for providing secure communication. For example, in one embodiment, the DH field 306 may be used as a transport security protocol such as, but not limited to, TCP-AO and TCP-MD5, which is referred to herein as Security Option-1. TCP-AO and TCP-MD5 provide cryptographic authentication and message integrity verification between two end-points. Alternatively, the DH field 306 may also be used to indicate a DH key exchange between the source node and the destination node, which is referred to herein as Security Option-2. Diffie-Hellman is an algorithm used to establish a shared secret between two parties. It is primarily used as a method of exchanging cryptography keys for use in symmetric encryption algorithms. For instance, in one embodiment, a DH pair may be exchanged between the endpoints in the TCP 3-way handshake as part of data in the SYN/Syn-Ack/Sync-Ack-Ack messages in establishing the communication session between the endpoints. In this embodiment, a shared secret is computed and used to authenticate the change of IP address from either the source or the destination endpoint. As an example, in one embodiment, when a non-zero Diffie-Hellman value is being exchanged, the following DH Bits in the DH field 306 may be used to indicate the following:

0 0: NO Diffie-Hellman values exchanged.

0 1: 1024-bit Modular Exponential (Mod P) Group (mandatory).

1 0: 2048-bit Mod P Group/elliptic curve groups which has 200 bits Mod P.

1 1: Reserved.

The above settings are just one example embodiment and the above bits may be used to indicate possibly some other Mod P DH group in other embodiments. One advantage of having the above DH field 306 in the TCP-SMO data structure 300 is that it provides the ability to change the DH algorithm as needed.

Additionally, in various embodiments, security Option-2 may be applied can be applied to MultiPath TCP (MPTCP) protocol as well as to TCP protocol. Unlike current MP-TCP security, as specified in https://tools.ietf.org/html/draft-ietf-mptcp-rfc6824bis-10#section-2.7, where keys are sent in the clear in the MP_CAPABLE messages, and MP_JOIN messages are secured with HMAC-SHA256, security Option-2 of the disclosed embodiments enables DH exchange to obtain the shared keys, which may then be used to protect the MP_JOIN message.

In one embodiment, the M field 308 is used to specify a mobility event. A mobility event as referenced herein occurs when an endpoint (e.g., source 102 and/or destination 104)

switches from a first network access point having a first IP address to a second network access point having a second IP address. As stated above, under current TCP implementation a mobility event results in a communication session between two endpoints being reset (i.e., closed and reestablished using the new IP address). However, as will be further described, in accordance with the disclosed embodiments, an endpoint may indicate the occurrence of a mobility event using the TCP-SMO data structure 300, and the communication session between the two endpoints may be maintained.

In one embodiment, the flags field 310 may be configured to specify or indicate a certain condition as would be standardized by the TCP-IANA. Alternatively, in certain embodiments, the flags field 310 may be left undefined and/or user-configured for a particular purpose. The SL field 312 may be configured to specify the source CID length (e.g., 4 bits) or length of the source identifier in bytes. Similarly, the DL field 314 may be configured to specify the destination CID length or length of the destination identifier in bytes. In one embodiment, the minimum source CID length and destination CID length is 4 bytes, and the maximum source CID length and destination CID length is 16 bytes.

In one embodiment, the source connection identifier (SCID) field 316 specifies the source connection identifier, and the destination connection identifier (DCID) field 318 specifies the destination connection identifier. In one embodiment, the connection identifiers are a random set of variable length descriptors that are used to identify the connection instead of the source and destination IP address in the TCP. The length of the SCID and the DCID is respectively indicated by the SCID length in the SL field 312 and the DCID length in the DL field 314. In one embodiment, the source connection identifier and the destination connection identifier may be generated by a TCP module or TCP stack, or may be supplied by an application or other protocol (e.g., Locator ID Separation Protocol (LISP), Host Identity Protocol (HIP), ION, or any other identified (ID) related protocol) while opening the TCP socket. In one embodiment, an initiator of a TCP connection uses 2 identifiers (source and destination connection identifiers) when initiating a TCP connection and for the rest of the session. In one embodiment, if the destination does not support the disclosed TCP-SMO, the TCP connection uses the regular TCB connection identifiers as described below in reference to FIG. 6.

Figure 4:
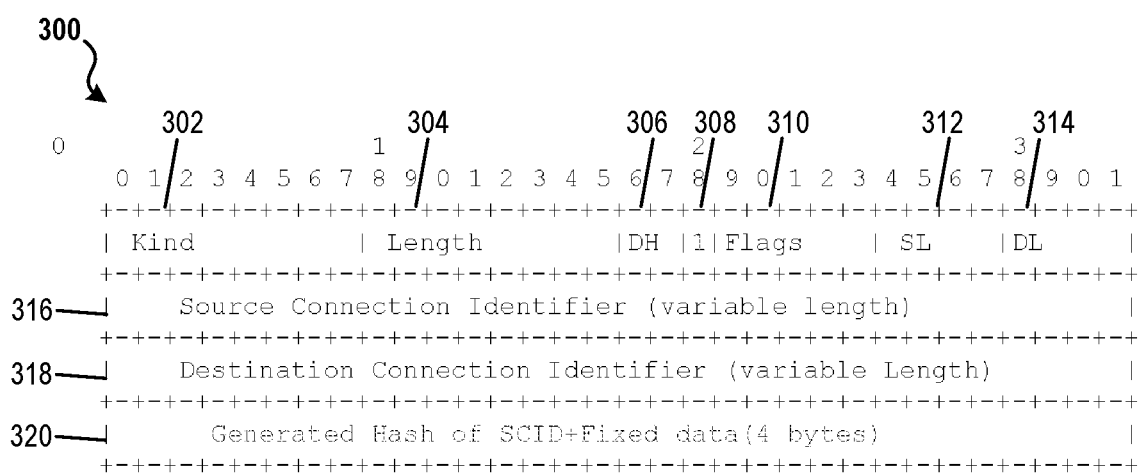
FIG. 4 is a schematic diagram illustrating the TCP-SMO data structure of FIG. 3 with the mobility option activated in accordance with an embodiment of the present disclosure.

In one embodiment, the optional data field 320 is 4 bytes and must be present only when the M field 308/bit is set. As an example, FIG. 4 is a schematic diagram illustrating the TCP-SMO data structure 300 with the mobility option activated in accordance with an embodiment of the present disclosure. As shown FIG. 4, in this embodiment, the mobility option is activated to indicate that a mobility event has occurred by setting the bit in the M field 308 to "1." The optional data field 320 contains the 4 bytes indicating the checksum of a generated hash of the source connection identifier and a fixed data/string. The fixed string helps normalize the total data for the hash function as connection identifiers length can be as low as 4 bytes. For example, in one embodiment, the optional data field 320 contains the keyed hash of the source connection identifier concatenated with a fixed 12 byte string (e.g., 0xFEFEFEFEABABA-BABDEDEDEDE). In one embodiment, if Security Option-1 is used, the hash function uses a Secure Hash Algorithm 1 (SHA1-96) to hash the above concatenated data. SHA1-96 is a cryptographic hash function which takes an input and produces a 160-bit (20-byte) hash value known as a message digest. The optional data field 320 data stores the checksum of this hash data. In one embodiment, if Security Option-2 is used, the hash function may use Advanced Encryption Standard-128-Cipher-based Message Authentication Code-96 (AES-128-CMAC-96) based on the [National Institute of Standards and Technology (NIST)-SP800-38B][Federal Information Processing Standard (FIPS) 197]. In this embodiment, the optional data field 320 data is the checksum of the keyed hash data. In one embodiment, the checksum and hash is generated on the side of communication that detects an IP address change and needs to provide seamless mobility.

Figure 5:
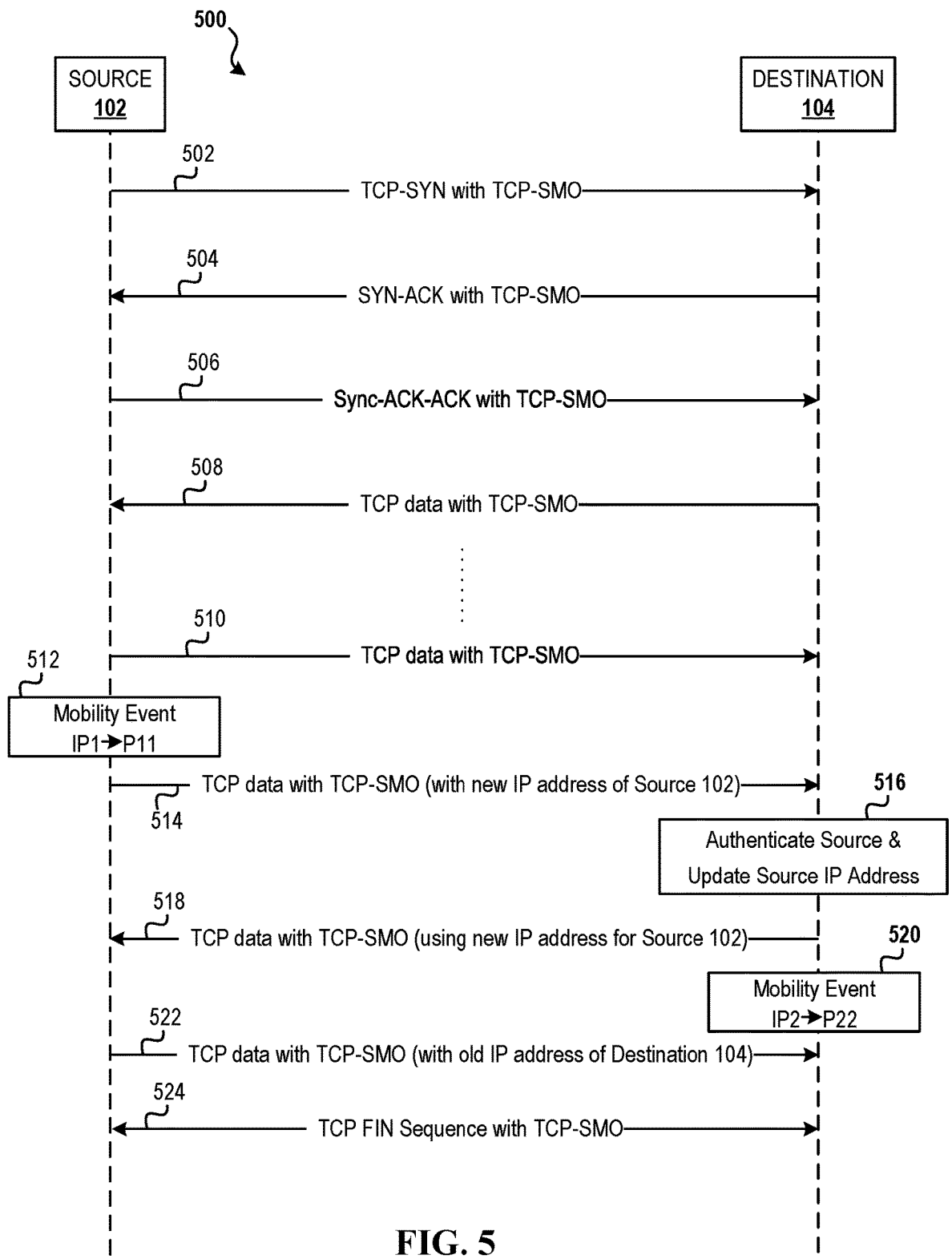
FIG. 5 is a sequence diagram illustrating a communication session with TCP-SMO in accordance with an embodiment of the present disclosure.

FIG. 5 is a sequence diagram 500 illustrating a communication session with TCP-SMO in accordance with an embodiment of the present disclosure. In the depicted embodiment, the TCP segment sequence diagram 500 represents a full connection from a 3-way handshake to a connection close with the newly defined TCP-SMO. In the depicted embodiment, the initial IP address of the source 102 is IP1 and the initial IP address of the destination 104 is IP2. TCP-SMO is negotiated at session startup and is only active if both sides support the TCP-SMO. Steps 502 to 506 illustrate the process of establishing a communication session between the source node and the destination node using the TCP-SMO data structure in the TCP header. Beginning with step 502, the source sends a TCP-Synchronize (TCP-SYN) message with TCP-SMO. In one embodiment, if the source and destination connection identifiers are chosen by an application and given to TCP, both may be present in the TCP-SYN message. If TCP is configured to select or generate the connection identifiers, the source 102 selects/generates the unique (local to the TCP stack) connection identifier (source CID) for the TCP-SMO data structure. In one embodiment, the source 102 keeps the destination connection identifier as 0x0 with minimum length 4 bytes in the TCP-SYN segment. When the destination 104 receives this segment, the destination 104 determines whether it supports TCP-SMO, and if so, it allocates another unique connection identifier (destination CID) and provides the destination CID using the TCP-SMO in a SYN-acknowledgement (SYN-ACK) message to the source 102 as illustrated by step 504. The source 102, at step 506, sends a Sync-ACK-ACK segment to the destination 104 to the complete the 3-way hand shake process of establishing the communication session using the TCP-SMO between the source 102 and the destination 104. At the source 102 and the destination 104, the TCB is established with look up parameters by source CID, destination CID, source port, and destination port; instead of using the IP addresses of the source 102 and destination 104 as described in RFC 793 Section 2.7.

Steps 508 and 510 illustrate the exchanging of data between the source 102 and destination 104 over the established communication session. These data segments include the TCP-SMO in the TCP header. In the depicted embodiment, at step 512, a mobility event occurs at the source 102 and its IP address is changed from IP1 to IP11. An IP address change may occur if any IP address (connected route) is deleted or is modified. In accordance with the disclosed embodiments, any change to the IP address on the local stack must be notified to the TCP layer. This ensures that the TCP layer indicates this change to the destination 104. In this case, the TCP layer is notified of this change and the TCP layer determines another source IP address for this existing connection if the sockets that are bound to the deleted IP address had their Mobility Flag ON. In this case, both the old IP address and the new IP address is updated to the local TCP to identify the old connection and to enable TCP to find new source IP for that connection (not necessarily the changed IP, but based on the route lookup on the destination IP).

At step 514, the source 102 transmits a data segment with the new source IP address (IP11) with the bit in the M field 308 in the TCP-SMO data structure 300 being set to indicate the mobility event, and with the optional data field 320 containing the checksum of a generated hash of the source connection identifier. For pending data from application, the TCB uses the new source IP address and sends the segment with application data. In one embodiment, if there is no data segment to be sent by source during mobility event, either a TCP keep alive segment or empty data packet is sent with this new IP to update the destination 104 of the new Source IP address. In one embodiment, the in-flight data may be buffered during an IP address change. For instance, in one embodiment, during an IP address change, the local host where the change occurs may have a handshake mechanism with the TCP stack and during that time, any received data may be buffered.

At step 516, the destination 104 authenticates that the message was received from source 102 (e.g., using the generated hash), and if authenticated, the IP address of the source 102 is updated. Because the TCB does not use the IP address of the source 102 to identify the communication session/connection between the source 102 and the destination 104, the IP address of the source 102 can be updated in the TCB without resetting the communication session between the source 102 and the destination 104. In one embodiment, if the destination cannot verify that IP1 sent the data for change to IP11 then it terminates the session, which is the same as existing behavior. At step 518, the destination 104 transmits data to the source 102 using the new IP address (IP11) of the source 102.

In the depicted embodiment, at step 520, the destination 104 experiences a mobility event that changes its IP address from IP2 to IP22. However, if at step 522, the source 102 transmits data to the destination 104 before the destination 104 can inform the source 102 of the mobility event (i.e., the IP address change of the destination 104), any data sent to the destination 104 using the old IP address of the destination 104 (i.e., IP2) will be lost and would be retransmitted by the source 102 when it is informed of the new IP address of the destination 104. Once either endpoint decides to terminate the connection, regardless of which end initiates the socket close, they exchange TCP-FIN messages that include the TCP-SMO at step 524. The TCP-FIN message indicates the end of data transmission to finish a TCP connection.

Figure 6:
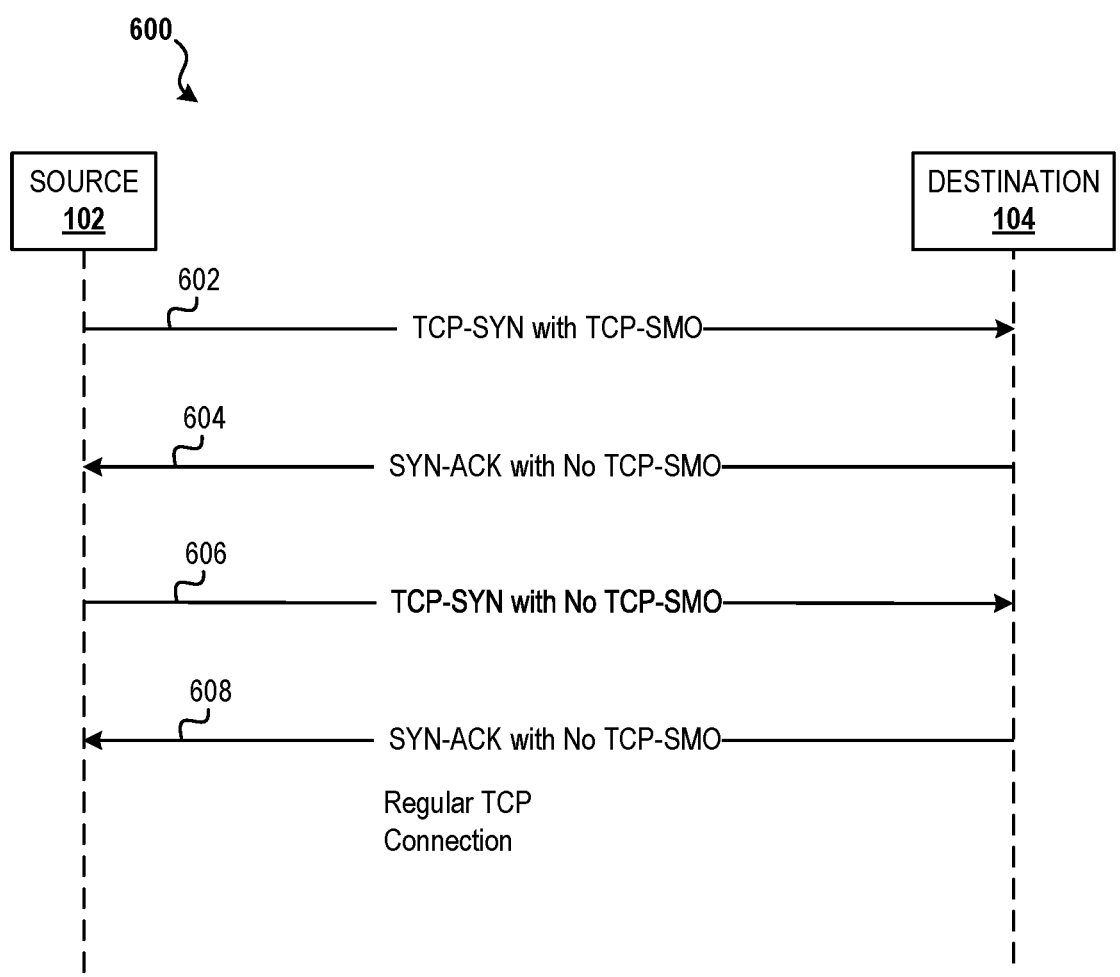
FIG. 6 is a sequence diagram illustrating a communication session without TCP-SMO in accordance with an embodiment of the present disclosure.

FIG. 6 is a sequence diagram 600 illustrating a TCP-SMO with an unsupported destination 104 in accordance with an embodiment. In the depicted embodiment, the source 102 at step 602 sends a TCP-SYN message with TCP-SMO to the destination 104. However, in the depicted embodiment, the destination 104 does not support the new TCP-SMO. Thus, the destination 104 at step 604 sends back a SYN-ACK without the TCP-SMO. In one embodiment, if the source 102 receives a SYN-ACK message without the TCP-SMO, the source 102 at step 606 is configured to revert back to establishing a traditional TCP communication session without TCP-SMO (where TCB uses regular connection identifiers as specified in RFC 793) by sending the TCP-SYN message without the TCP-SMO to the destination 104. At step 608, the destination 104 transmits a SYN-ACK with no TCP-SMO to acknowledge the TCP-SYN message to establish the traditional TCP communication session.

Figure 7:
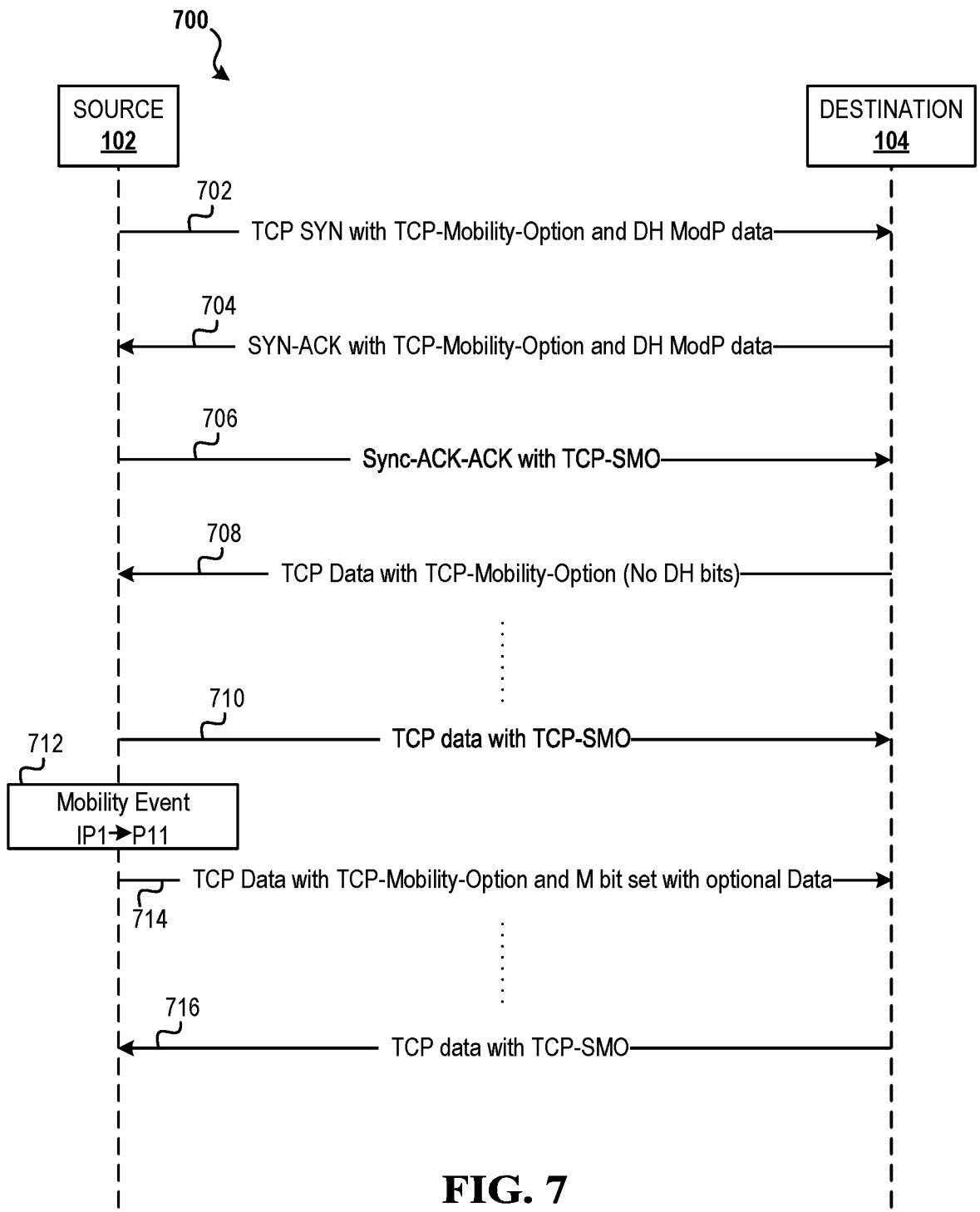
FIG. 7 is a sequence diagram illustrating a communication session with secured TCP-SMO in accordance with an embodiment of the present disclosure.

FIG. 7 is a sequence diagram 700 illustrating a communication session using DH for providing secured TCP-SMO in accordance with an embodiment of the present disclosure. Similar to FIG. 5, steps 702, 704, and 706 illustrate the process of establishing a secured communication session between the source 102 and the destination 104 using the TCP-SMO data structure with DH security option. Beginning with step 702, communications between the source 102 and the destination 104 is initiated with the source 102 sending the destination 104 a TCP SYN message with TCP-SMO and DH mod P data with length (1024-bit, 2048-bit) based on the group specified in the DH Flags. In one embodiment, the TCP-SMO DH flags will have non-zero value and a particular DH group used by the source 102 is configured to generate the Mod P value. When destination 104 receives this message, assuming that the destination 104 supports the TCP-SMO and DH group, the TCB of the destination 104 uses the connection identifiers in the TCP-SMO instead of IP addresses and generates the Mod P value. At this point, the destination 104 may compute the DH shared secret, which would be used during mobility as a symmetric key for authenticating information.

At step 704, the destination 104 sends back a SYN-ACK message with the TCP-SMO and Mod P data to the source 102. When the source 102 receives the SYN-ACK message, the source 102 also computes a shared secret to be used during mobility as a symmetric key for authenticating information.

At step 706, the source 102 transmits a SYN-ACK-ACK message with TCP-SMO to the destination 104, completing the 3-way hand shake process of establishing the communication session using the TCP-SMO with DH security option between the source 102 and the destination 104. Steps 708 through 710 illustrate the exchanging of data between the source 102 and destination 104 over the established communication session. These data segments include the TCP-SMO in the TCP header, but without the DH bits.

At step 712, a mobility event at the source 102 occurs that changes the IP address of the source 102 from IP1 to IP11. At step 714, the source 102 transmits a data segment containing the new IP address along with TCP-SMO 'M' bit set and with the 4 byte optional data to the destination 104. In one embodiment, the 4 byte optional data comprises the checksum of the hash computed using the DH shared secret. As an example, in one embodiment, the optional-data=checksum(Hash((Source Connection Identifier+fixed data normalizer), DH-Shared-Secret)), where the fixed data normalizer is 0xFEFEFEFEABABABABDEDEDEDE. In one embodiment, the Length of optional data is the first 4 bytes of the checksum, and the hash algorithm to be used is AES-128-CMAC-96.

In the above sequence, the DH shared secret is being used as a key to generate the hash and a regular TCP header checksum algorithm is used to compute the checksum for the resulted hash output. The above embodiment does not present a security issue as the generated hash is not truncated to keep it in the 4 byte optional data, rather the 4-byte checksum of this hash is kept.

When the destination 104 receives the above segment with M bit set, the destination 104 computes the checksum of the hash for the new IP address and compares the locally generated hash with the received value transmitted in the optional data field in the TCP-SMO. If the values match, it ensures that the mobility event is received from the source 102 and that the new IP address (e.g., IP11) is correct. In response to the above authentication, the destination 104 at step 716 transmits TCP data messages to the source 102 using the new IP address of the source 102.

The above sequence diagram relies on the "data" to be sent during 3-way handshake. In one embodiment, this data is not application data but the Mod P (DH public value) for selected DH group. In some embodiments, as the size of this data is anywhere from 1024 bits (DH Group-1) to 2048 bits (DH Group-2)/200 bits (Elliptic curve DH groups), sending this as part of option data is not possible (limited option space in the TCP header). Although section 3.4 of RFC 793 specifies and allows a mechanism to send application data during the TCP 3-way handshake, in accordance with an embodiment, this "data" should not be sent to the application until completion of handshake. Thus, in accordance with an embodiment, the data is consumed by the TCP end host stack until the handshake process is completed.

Figure 8:
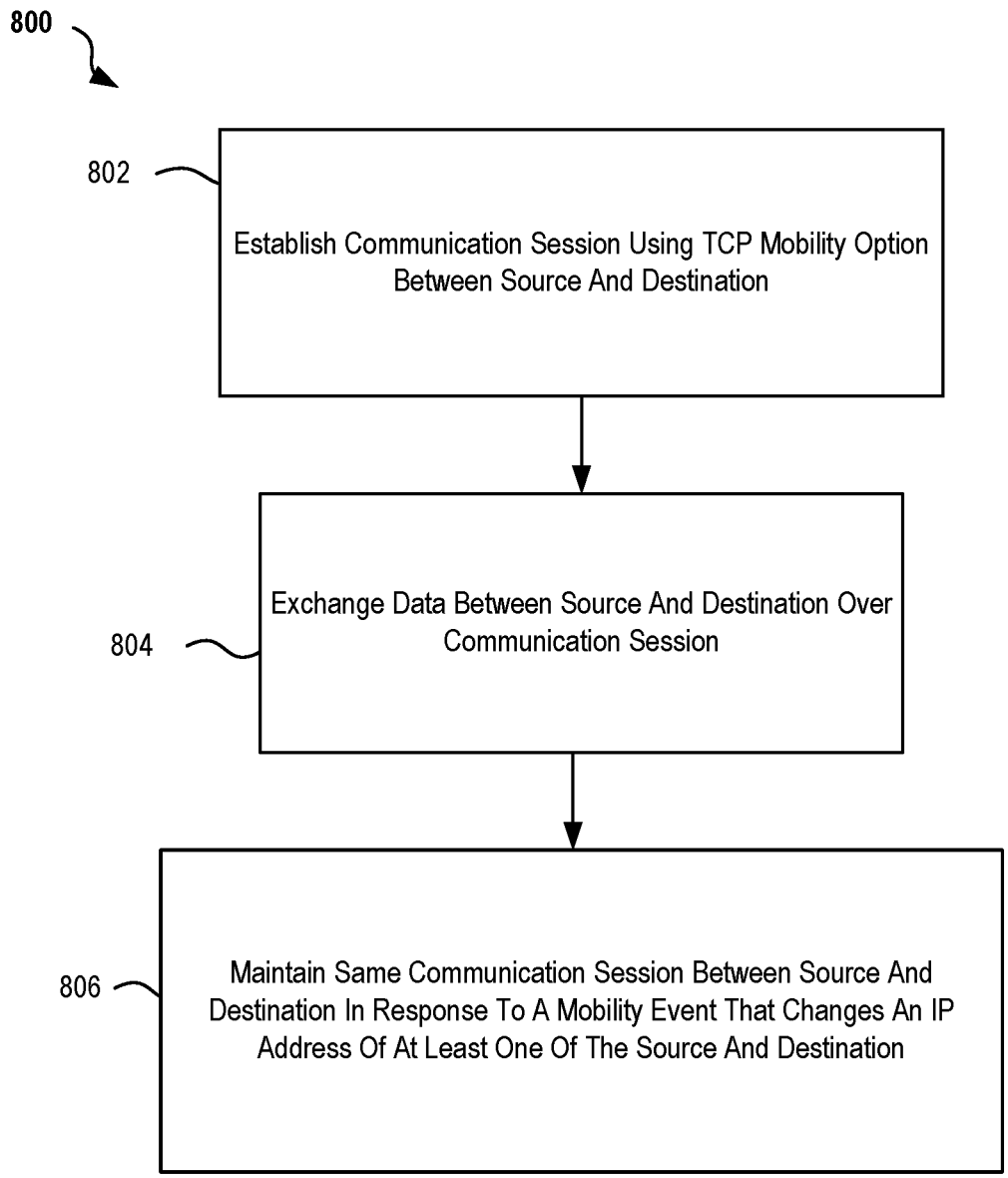
FIG. 8 is a flowchart illustrating a method for providing seamless mobility for TCP transport with session continuity in accordance with an embodiment of the present disclosure.

FIG. 8 is a flowchart illustrating a method 800 for providing mobility for TCP transport with session continuity in accordance with an embodiment of the present disclosure. In one embodiment, the method 800 may be initiated or performed by either endpoints of a communication session. The method 800 begins at step 802 by establishing a communication session using TCP-SMO between a source node and a destination node. As described above, the communication session may be established by completing a 3-way handshake (TCP-SYN, SYN-ACK, and SYN-ACK-ACK) with the TCP-SMO. At step 804, the method 800 exchanges data message with the TCP-SMO between the source node and the destination node over the established communication session. At step 806, the method 800 maintains the same communication session between the source node and the destination node in response to a mobility event using the TCP-SMO connection identifier that changes an IP address of at least one of the source node and/or destination node. As described above, the process of maintaining the same communication session includes sending, by the device that a mobility event occurs at, a new IP address of the device to the other endpoint. Once the other endpoint authenticates the data such as verifying the correct IP address and that the correct node sent the message, it can identify the communication session using the connection identifiers in the TCP-SMO and the TCB, and update the IP address of the remote node so that new communications may be directed to the new IP address using the same communication session without having to re-establish the 3-way handshake.

Figure 9:
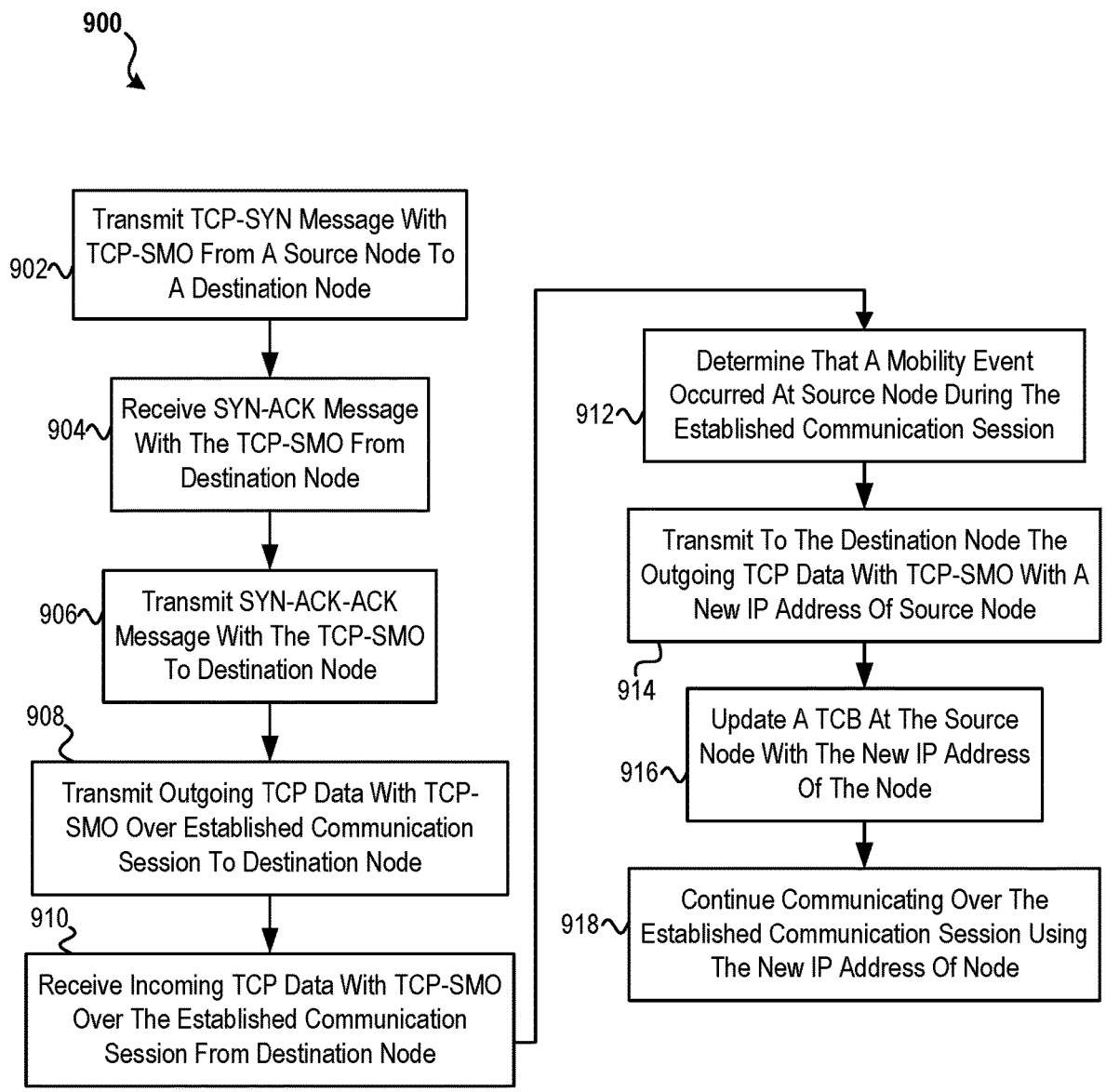
FIG. 9 is a flowchart illustrating another method for providing seamless mobility for TCP transport with session continuity in accordance with an embodiment of the present disclosure.

FIG. 9 is a flowchart illustrating a method 900 for providing seamless mobility for TCP transport with session continuity in accordance with an embodiment. In one embodiment, the method 900 is performed by a source node such as the source 102 that establishes communication with a destination node such as destination 104. In the depicted embodiment, the method 900 at step 902 transmits a TCP-SYN message with a TCP-SMO that includes a source connection identifier from the source node to a destination node for establishing a communication session between the source node and the destination node. The source node at step 904 receives a SYN-ACK message with the TCP-SMO with a destination connection identifier indicating that the destination node supports the TCP-SMO. At step 906, the source node transmits to the destination node a SYN-ACK-ACK message with the TCP-SMO acknowledging receipt of the SYN-ACK message for establishing the communication session between the source node and the destination node. The source node updates the TCB to use the connection identifiers of the source node and the destination node to identify the communication session.

At step 908, the source node transmits to the destination node outgoing TCP data with the TCP-SMO during the communication session between the source node and the destination node. In return, the source node at step 910 receives from the destination node incoming TCP data with the TCP-SMO during the communication session between the source node and the destination node.

During the communication session between the source node and the destination node, the source node at step 912 determines that a mobility event occurred at the source node. In response to this mobility event, the source node at step 914 transmits to the destination node the outgoing TCP data with the TCP-SMO with a new IP address of the source node over the established communication session between the source node and the destination node for enabling the destination node to update the IP address of the source node (after verification of the information as described above). At step 916, the source node updates the TCB at the source node with the new IP address of the source node. The source node at step 918 continues to communicate with the destination node during the communication session between the source node and the destination node until the session is terminated.

Figure 10:
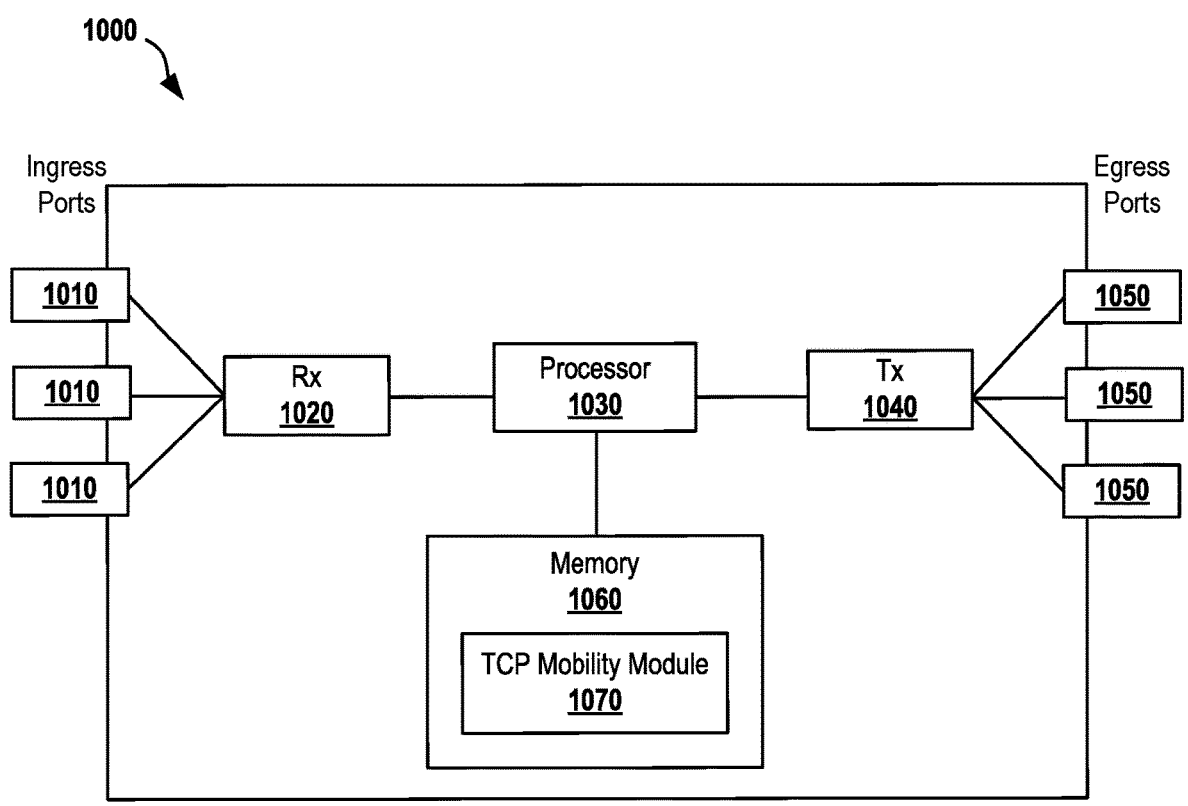
FIG. 10 is a schematic diagram illustrating an apparatus in accordance with an embodiment of the present disclosure.

FIG. 10 is a schematic diagram of an apparatus 1000 configured to implement one or more of the methods disclosed herein according to an embodiment of the disclosure. For example, the apparatus 1000 may represent a source node and/or a destination node. The apparatus 1000 comprises ingress ports 1010 and receiver units (Rx) 1020 for receiving data, a processor, logic unit, or central processing unit (CPU) 1030 to process the data, transmitter units (TX) 1040 and egress ports 1050 for transmitting the data, and a memory 1060 for storing the data. The apparatus 1000 may also comprise optical-to-electrical (OE) components and electrical-to-optical (EO) components coupled to the ingress ports 1010, the receiver units 1020, the transmitter units 1040, and the egress ports 1050 for ingress or egress of optical or electrical signals.

The memory 1060 comprises one or more disks, tape drives, or solid-state drives and may be used as an over-flow data storage device, to store programs when such programs are selected for execution, or to store instructions and data that are read during program execution. The memory 1060 may be volatile and/or non-volatile and may be read-only memory (ROM), random-access memory (RAM), ternary content-addressable memory (TCAM), or static random-access memory (SRAM).

The processor 1030 is implemented by any suitable combination of hardware, middleware, firmware, and software. The processor 1030 may be implemented as one or more CPU chips, cores (e.g., as a multi-core processor), field-programmable gate arrays (FPGAs), application specific integrated circuits (ASICs), or digital signal processors (DSPs). The processor 1030 is in communication with the ingress ports 1010, receiver units 1020, transmitter units 1040, egress ports 1050, and memory 1060. In one embodiment, the memory 1060 comprises a TCP mobility module 1070. The TCP mobility module 1070 comprises executable instructions for implementing the disclosed embodiments as described above. The processor 1030 executes those instructions. Further in the alternative, the apparatus 1000 comprises other means to implement the embodiments.

Accordingly, the disclosed embodiments introduces a TCP-SMO data structure that may be used to alter the TCP host stack on both ends of the connection including how the TCB as defined in RFC 793 Section 2.7 can be looked up and subsequently used for providing seamless mobility. In one embodiment, the TCB is created when an Open call is done at the host stack. In one embodiment, during connection Open time, a flag may be set to indicate the use of the TCP-SMO with additional parameters as required.

The disclosed embodiments are superior to current solutions for mobility for TCP such as tunnel based solutions (e.g., LISP), encapsulation based solution (e.g., HIP and LISP), translation based solution (e.g., Identifier Locator Address (ILA) (with Generic User Datagram Protocol (UDP) Encapsulation (GUE))), and multiple TCP Connections with load balancing options (e.g., Multipath TCP (MPTCP)). For example, the disclosed embodiments are superior to any tunnel, encapsulation, or encapsulation with translation based solution because all these incur additional overhead (message size, checksum computation and separate processing for additional layer) and also can depend on intermediate nodes in the network to be upgraded, whereas the disclosed embodiments do not. Additionally, MPTCP requires more complex signaling than the disclosed embodiments. Other drawbacks of MPTCP include performance issues, congestion control related issues, and MPTCP requires that a host have insight into the underlying network topology in order to create multiple paths.

The disclosed embodiments also provide several key distinctive advantages or implementations over other suggested methods such as that presented by Snoeren in https://tools.ietf.org/html/draft-snoeren-tcp-migrate-00. For example, Snoeren's disclosed method requires an additional 3-way handshake during connection migration, which is not required using the disclosed embodiments. Second, Snoeren's disclosed method requires the use of two separate options, a Migrate Permitted Option and a Migrate Option, whereas the disclosed embodiments only use one mobility option. Third, Snoeren's disclosed security option is limited to truncated elliptic curve, whereas other DH variants are available in the disclosed embodiments. Fourth, Snoeren's disclosed method sends security data in the TCP option itself, whereas the disclosed embodiments provides the security data in a data portion that is processed by the TCP layer. Fifth, in terms of changes in the TCP layer, in Snoeren's disclosed method, the TCB gets migrated after the new 3-way handshake, whereas the disclosed embodiments rely on the use of connection identifiers.

Additional advantages of the disclosed embodiments over the current art include, but are not limited to, least latency for continuity; no round trip for mobility event update to peer; only requires an end host change as opposed to network infrastructure changes; applications do not see a change in their application programming interface (API) to TCP; users have control over which session to protect for mobility continuity, security is provided using known TCP-AO or IPSec to protect session and/or using embedded authentication with DH. Additionally, the disclosed embodiments are not affected by Network Devices (95% of routers pass thru TCP Options); Network address translation (NAT)/Network Address and Port Translation (NAPT) boxes in the transport path; and may be used as a data plane for multiple ID based protocols (LISP, HIP, and ILA).

Additionally, in one embodiment, the disclosed embodiments do not have any impact of NAT/NAPT devices between the source and the destination devices because the TCB uses only the source and destination connection identifiers. In addition, during mobility, the authentication data uses a stable source identifier to verify the hash on both sides (i.e., doesn't include new IP address or port).

In one embodiment, because any new TCP options are prone to be dropped by middle boxes (e.g., this is generally applies to 5% of TCP connections per RFC 7413 section 7.1), to handle this issue, after the initial time out of the SYN with TCP-SMO, which indicate the path encountered an unsupported middle box, the source sends a SYN segment without this option (i.e., fallback to regular TCP-SYN), thus resorting to native TCBs and hence not having seamless mobility.

The disclosed embodiments are best implemented using a secure connection as an existing TCP connection may be hijacked by changing the source IP address (Connection Hijacking). For example, in one embodiment, the disclosed embodiments may be implemented by using security at IP (IPsec) or transport layer (TCP-AO/TCP-MD5) for securing the TCP connection including the TCP header. In one embodiment, when TCP-AO is used, the TCP-SMO size must not be exceeded more than 12 bytes to accommodate TCP-AO/TCP-MD5. In one embodiment, with the TCP-AO option for authentication of an IP Address change, the source and destination connection identifiers have to be fixed at 4 bytes each for a valid TCP-SMO.

In another embodiment, the security for TCP-SMO is done in-line within the newly defined TCP-SMO by exchanging a DH public value and computing a shared secret at both ends, which can be used as a key to generate a hash value (pre-defined has algorithm) during mobility. In one embodiment, DH groups and the hash algorithms are pre-defined and are implemented with the TCP-SMO to provide the needed security.

In accordance with an embodiment, when a device/UE (user equipment) connects to a TCP server, in a majority of the cases, the TCP server does not change its location. To support device/UE mobility, in one embodiment, the server TCP stack must be updated to support the TCP-SMO. In one embodiment, one way to mitigate this update at the server side is by using a TCP server proxy where TCP-SMO is implemented.

Certain embodiments disclosed herein may be seen as potential "data plane" alternatives to existing ID based protocols viz., LISP (RFC 6830) or HIP (RFC 7401) with respective control plane protocols. The disclosed embodiments do not specify any changes to the control plane for existing identifier based protocols. However, existing identifier based protocols will have some restrictions to use the "data plane" proposed in this document (e.g., limitation on the length of Identifier in TCP-SMO (variable, maximum 16 bytes)).

Certain embodiments disclosed herein may be used with new identity based common control plane protocols such as, but not limited to, those specified in "https://tools.ietf.org/html/draft-padma-ideas-problem-statement-01" for providing a "data plane" solution for applications using TCP transport, which is incorporated in its entirety herein. In certain embodiments, UDP based applications may use a mobility solution with Quick UDP Internet Connections (QUIC) protocol, which allows the same.

Further, as described above, in accordance with an embodiment, if the TCP-SMO is not present, the TCP connection continues to identify the TCB with connection identifiers as specified in RFC 793. Thus, in accordance with the disclosed embodiments, the old way of identifying the connection/TCB per RFC 793 and the proposed embodiments with connection identifiers in the TCP-SMO are both supported. For example, in one embodiment, both methods may be supported by maintaining two separate TCBs or by harmonizing the keys to access the existing TCB.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for providing mobility for Transmission Control Protocol (TCP) transport with session continuity between a first communication device and a second communication device, the method comprising:
    establishing, by the first communication device, a communication session between the first communication device and the second communication device using a TCP seamless mobility option (TCP-SMO) connection identifier specified in a TCP-SMO data structure for identifying the communication session between the first communication device and the second communication device;
    exchanging, by the first communication device, data packets containing data between the first communication device and the second communication device during the communication session; and
    maintaining, by the first communication device, the communication session between the first communication device and the second communication device in response to a mobility event using the TCP-SMO connection identifier, wherein an indication that the mobility event has occurred is based on a mobility bit field setting in the TCP-SMO data structure, and wherein the TCP-SMO data structure indicating the mobility event is included in the data packets containing the data being exchanged between the first communication device and the second communication device during the communication session.

2. The method of claim 1, wherein the TCP-SMO connection identifier comprises a first TCP-SMO connection identifier of the first communication device.

3. The method of claim 1, wherein the TCP-SMO connection identifier comprises a first TCP-SMO connection identifier of the first communication device and a second TCP-SMO connection identifier of the second communication device.

4. The method of claim 1, wherein establishing the communication session between the first communication device and the second communication device comprises:
    transmitting, by the first communication device, a TCP-Synchronize (TCP-SYN) message with the TCP-SMO connection identifier in a TCP header of the TCP-SYN message to the second communication device;
    receiving, by the first communication device, a Synchronize-Acknowledgement (SYN-ACK) message with the TCP-SMO connection identifier in the TCP header of the SYN-ACK message indicating that the second communication device supports TCP-SMO; and
    transmitting, by the first communication device, a Synchronize-Acknowledgement-Acknowledgement (SYN-ACK-ACK) message with the TCP-SMO connection identifier in the TCP header of the SYN-ACK-ACK message to the second communication device acknowledging receipt of the SYN-ACK message to establish the communication session between the first communication device and the second communication device.

5. The method of claim 1, wherein maintaining the communication session between the first communication device and the second communication device in response to the mobility event comprises:
    receiving, by the first communication device, a new Internet Protocol (IP) address of the second communication device from the second communication device during the communication session in response to the mobility event.

6. The method of claim 1, wherein maintaining the communication session between the first communication device and the second communication device in response to the mobility event comprises:
    transmitting, by the first communication device, a new IP address of the first communication device to the second communication device during the communication session in response to the mobility event.

7. The method of claim 1, wherein maintaining the communication session between the first communication device and the second communication device in response to the mobility event comprises:
    transmitting, by the first communication device, a new IP address of the first communication device in a TCP keepalive probe packet to the second communication device during the communication session in response to the mobility event.

8. The method of claim 1, wherein the TCP-SMO connection identifier is a unique randomly generated identifier that is generated by a TCP stack of the first communication device.

9. The method of claim 1, wherein the TCP-SMO connection identifier is a unique randomly generated identifier that is provided to a TCP layer of the first communication device by one of an application or a second protocol during opening of a TCP socket.

10. The method of claim 1, wherein the TCP-SMO data structure further includes a security field for specifying security options.

11. The method of claim 10, wherein the security options comprise transport security protocols TCP-Authentication Option (TCP-AO), TCP-Message Digest5 (TCP-MD5), and a Diffie-Hellman (DH) key exchange between the first communication device and the second communication device.

12. The method of claim 11, wherein the security field is a two bit field configurable to specify any DH group as a security option to protect an IP address change notification in response to the mobility event.

13. A communication device comprising
    a network communication interface configured to enable communication over a network;
    a memory storage unit comprising instructions; and one or more processors in communication with the network communication interface and the memory storage unit, wherein the one or more processors execute the instructions to:
    establish a communication session between the communication device and a second communication device using a TCP seamless mobility option (TCP-SMO) connection identifier specified in a TCP-SMO data structure for identifying the communication session between the communication device and the second communication device;
    exchange data packets containing data between the communication device and the second communication device during the communication session; and
    maintain the communication session between the communication device and the second communication device in response to a mobility event using the TCP-SMO connection identifier, wherein an indication that the mobility event has occurred is based on a mobility bit field setting in the TCP-SMO data structure, and wherein the TCP-SMO data structure indicating the mobility event is included in the data packets containing the data being exchanged between the first communication device and the second communication device during the communication session.

14. The communication device of claim 13, wherein the TCP-SMO connection identifier comprises a first TCP-SMO connection identifier of the communication device.

15. The communication device of claim 13, wherein the TCP-SMO connection identifier comprises a first TCP-SMO connection identifier of the communication device and a second TCP-SMO connection identifier of the second communication device.

16. The communication device of claim 13, wherein establishing the communication session between the communication device and the second communication device comprises:
    transmitting a TCP-Synchronize (TCP-SYN) message with the TCP-SMO connection identifier in a TCP header of the TCP-SYN message to the second communication device;
    receiving a Synchronize-Acknowledgement (SYN-ACK) message with the TCP-SMO connection identifier in the TCP header of the SYN-ACK message indicating that the second communication device supports TCP-SMO; and
    transmitting a Synchronize-Acknowledgement-Acknowledgement (SYN-ACK-ACK) message with the TCP-SMO connection identifier in the TCP header of the SYN-ACK-ACK message to the second communication device acknowledging receipt of the SYN-ACK message to establish the communication session between the communication device and the second communication device.

17. The communication device of claim 13, wherein the one or more processors are further configured to execute the instructions to transmit a new Internet Protocol (IP) address of the communication device to the second communication device during the communication session in response to the mobility event.

18. The communication device of claim 13, wherein the TCP-SMO connection identifier is a unique randomly generated identifier that is generated by a TCP stack of the communication device.

19. The communication device of claim 13, wherein the TCP-SMO connection identifier is a unique randomly generated identifier that is provided to a TCP layer by one of an application or a second protocol during opening of a TCP socket.

20. The communication device of claim 13, wherein the TCP-SMO connection identifier is included in a TCP-SMO data structure, wherein the TCP-SMO data structure further includes a two bit security field for specifying any Diffie-Hellman (DH) group as a security option to protect an IP address change notification in response to the mobility event.

* * * * *